United States Patent
Tseng et al.

(10) Patent No.: US 7,008,062 B2
(45) Date of Patent: Mar. 7, 2006

(54) EXHAUSTING STRUCTURE FOR REAR PROJECTION TELEVISION

(75) Inventors: Yung-Chuan Tseng, Miao-Li Hsien (TW); Bor-Bin Chou, Miao-Li Hsien (TW); Yi-Cheng Yuan, Miao-Li County (TW)

(73) Assignee: Coretronic Corporation, Miao-Li Hsien (TW)

( * ) Notice: Subject to any disclaimer, the term of this patent is extended or adjusted under 35 U.S.C. 154(b) by 0 days.

(21) Appl. No.: 10/707,802

(22) Filed: Jan. 13, 2004

(65) Prior Publication Data

US 2004/0156023 A1    Aug. 12, 2004

(30) Foreign Application Priority Data

Feb. 12, 2003    (TW) ............................... 92202467 U

(51) Int. Cl.
G03B 21/16    (2006.01)
G03B 21/18    (2006.01)
G03B 21/14    (2006.01)
G03B 21/22    (2006.01)
H04N 5/74    (2006.01)

(52) U.S. Cl. ............................ 353/60; 353/61; 348/748

(58) Field of Classification Search ................. 353/57, 353/52, 61, 67, 74, 79, 58, 60, 119; 348/748, 348/778, 789, 794, 836
See application file for complete search history.

(56) References Cited

U.S. PATENT DOCUMENTS

| 6,814,446 | B1 * | 11/2004 | Yamada et al. | ............... 353/60 |
| 6,871,959 | B1 | 3/2005 | Hsu et al. | |
| 2001/0022650 | A1 * | 9/2001 | Ono | ............................ 353/52 |
| 2002/0008852 | A1 * | 1/2002 | Onishi et al. | .................. 353/57 |

FOREIGN PATENT DOCUMENTS

| TW | 238027 | 1/1995 |
| TW | 443504 | 8/2001 |
| TW | 454889 | 9/2001 |
| TW | 458304 | 10/2001 |
| TW | 511721 | 11/2002 |

* cited by examiner

*Primary Examiner*—W. B. Perkey
*Assistant Examiner*—Rochelle Blackman
(74) *Attorney, Agent, or Firm*—Winston Hsu

(57) ABSTRACT

An exhausting structure used in a rear projection TV has a ventilating chamber inside a casing of the TV to separate an optical engine from the casing. A fan is mounted in the ventilating chamber near the optical engine to ventilate the heat from the inside of the TV via a conduit and an outlet. The fan is isolated from outside of the TV to reduce any noise generated from the fan.

7 Claims, 3 Drawing Sheets

EXHAUSTING STRUCTURE FOR REAR PROJECTION TELEVISION

BACKGROUND OF INVENTION

1. Field of the Invention

The invention relates to an exhausting structure, and more particularly to an exhausting structure used in a rear projection TV.

2. Description of the Prior Art

In a rear projection TV that becomes popular because of its low price and big screen, images are magnified by optical image projection technology. The image projection needs high-power bulbs as a light source to display with high brightness. Meanwhile, a fan is also needed to cool down the high temperature generated by the operation of the bulb to increase the service life of the bulb. Furthermore, heated optical components can be also cooled down so as to operate with optimal performance.

Referring to FIG 1, a conventional projection TV 10 is mounted inside a casing 11. An optical engine 12 mounted at a bottom of the casing 11 generates image beams that are projected on a front reflector 13, reflected to an upper reflector 14 and then reflected to a front screen 15 to display image frames. In order to dissipate heat generated from the high-power light source and other electronic components in the optical engine 12 50 so as not to accumulate the heat in the rear projection TV 10, a plurality of blowholes (not shown) is formed through the casing 11 to dissipate the heat by convention. The blowholes not only cannot prevent dusts from polluting the optical components, but also has limited dissipation effect due to internal heat recycle. Furthermore, strayed light from high-brightness image beams transmits through the blowholes, adversely affecting the display quality.

Therefore, a fan 16 is further provided on a rear portion of the casing 11 near the optical engine 12. The heat near the optical engine 12 that is a main heat source is forced to dissipate out of the casing 11. The fan 16 can be directly attached on the casing 11 to increase the heat dissipation. The fan 16 generates and spreads noises when in operation. The high-brightness image beams of the optical engine 12 travel through gaps between blades of the fan 16 and then are projected on objects nearby to form reflected lights. The reflected lights may interfere with the user when he or she watches the TV 10 within a dark background. Besides, the back of the TV 10 usually stands away from a wall to prevent the blowholes from being blocked, which limits the spatial arrangement of the TV 10.

SUMMARY OF INVENTION

One object of the invention is to provide an exhausting structure used in a rear projection TV, in which a fan is individually mounted to effectively prevent any noise generated by the rotation of the fan.

Another object of the invention is to provide an exhausting structure used in a rear projection TV, which includes a bent conduit to discharge heat, so that heat recycle can be avoided and heat dissipation effect can be increased.

Furthermore, another object of the invention is to provide an exhausting structure used in a rear projection TV, which is further provided with an outlet to reduce the limitation of orientated space.

Furthermore, another object of the invention is to provide an exhausting structure used in a rear projection TV, which includes an individual ventilating chamber to prevent dust contamination on optical elements.

In order to achieve the above and other objectives, the exhausting structure of the invention has a ventilating chamber in the rear projection TV to separate an optical engine from a casing of the TV. A fan is further mounted in the ventilating chamber near the optical engine to discharge the heat out of the TV via a bent and sound-absorptive conduit. An outlet is further formed on one side of the ventilating chamber to isolate any noise generated by the fan.

To provide a further understanding of the invention, the following detailed description illustrates embodiments and examples of the invention, this detailed description being provided only for illustration of the invention.

BRIEF DESCRIPTION OF DRAWINGS

The drawings included herein provide a further understanding of the invention. A brief introduction of the drawings is as follows.

DETAILED DESCRIPTION

Figure 1:
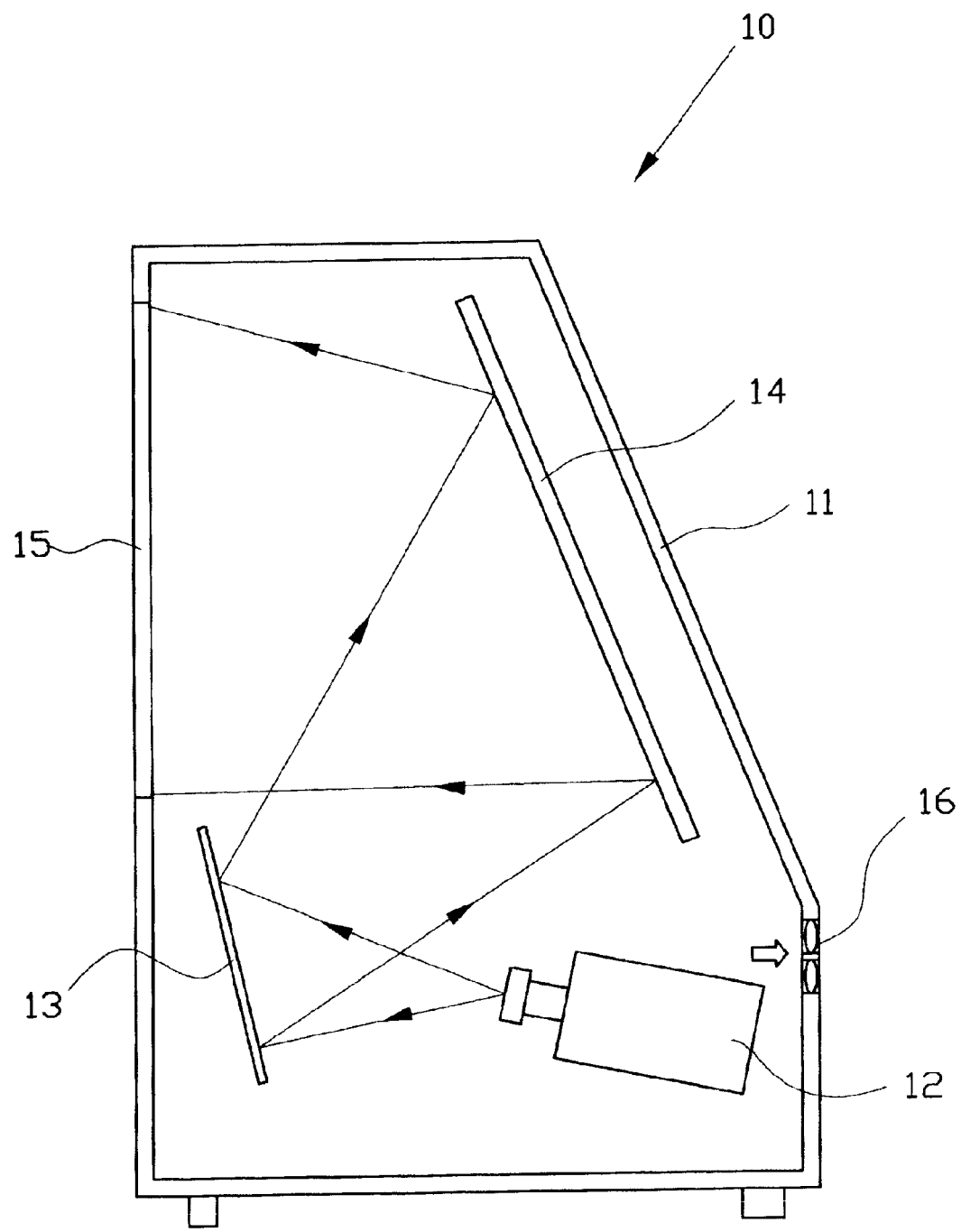
FIG. 1 is a schematic view of a conventional rear projection TV.

Wherever possible in the following description, like reference numerals will refer to like elements and parts unless otherwise illustrated.

Figure 2:
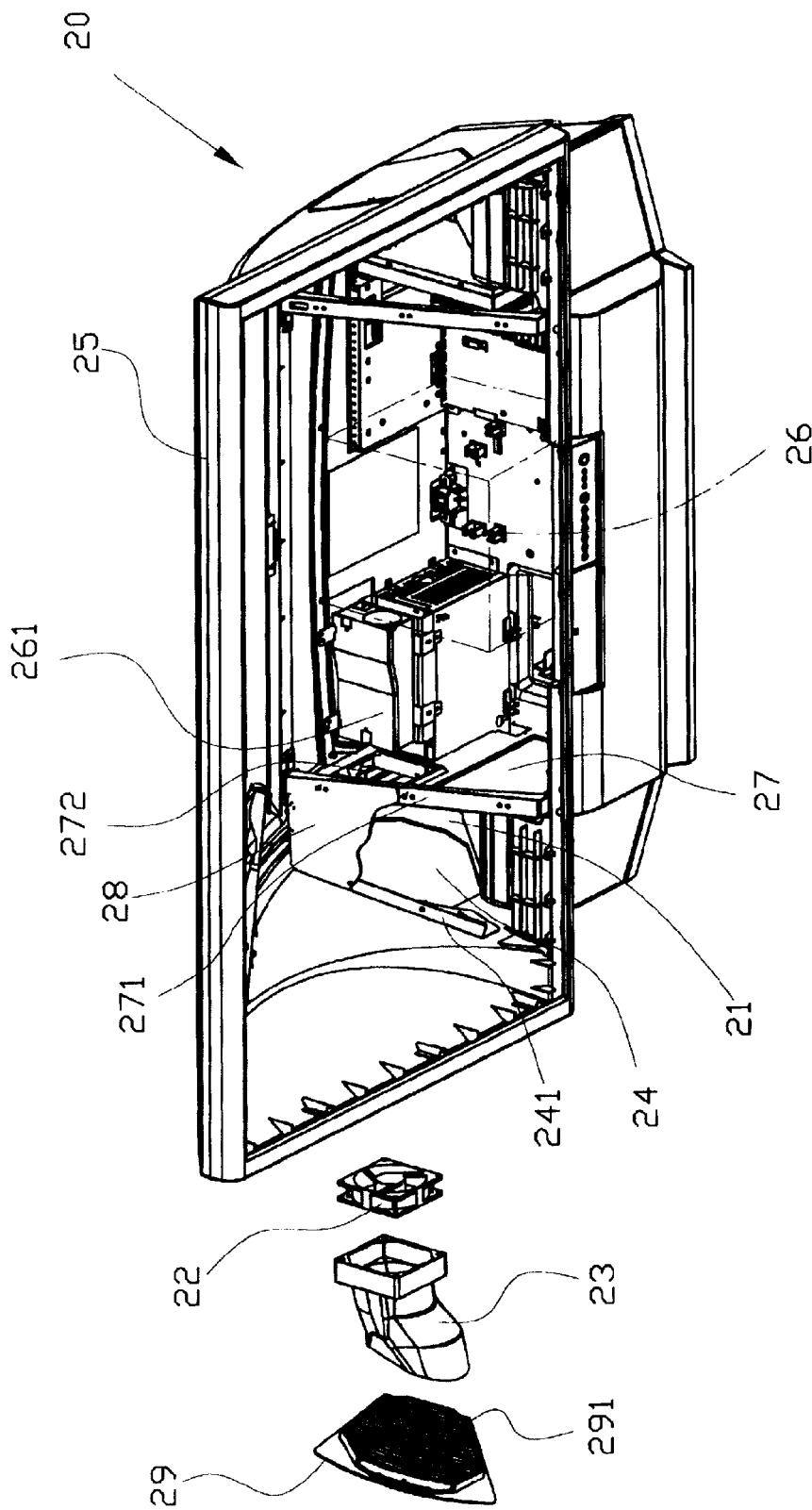
FIG. 2 is an exploded view of an exhausting structure that is to be assembled in a rear projection TV according to one embodiment of the invention.

Referring to FIG. 2, an exhausting structure used in a rear projection TV 20 according to one embodiment of the invention has a ventilating chamber 21, a fan 22 and a conduit 23 inside the TV 20. Heat is sucked by the fan 22 from the inside of the TV 20 and then discharged subsequently through the conduit 23 and an outlet 24 located out of the ventilating chamber 21.

The TV 20 ha a casing 25. An optical engine 26 is mounted at a bottom of the casing 25. A light source 261 of the optical engine 26 is mounted at one side of the optical engine 26. A spacer 27 is mounted near the light source 261 so that the spacer 27 and the casing 25 define the ventilating chamber 21 at a lower part of the TV 20. A supporting frame 271 is attached on an upper portion of the spacer 27 to support the spacer 27. A through hole 272 is formed through the spacer 27 near the light source 261. The outlet 24 is formed through the casing 25 to correspond to the through hole 272. Another supporting frame 241 is mounted inside the casing above the outlet 24. A cover 28 is placed on the supporting frames 271, 241 over the ventilating chamber to isolate light from the optical engine 26 and hot air from the light source 261.

Figure 3:
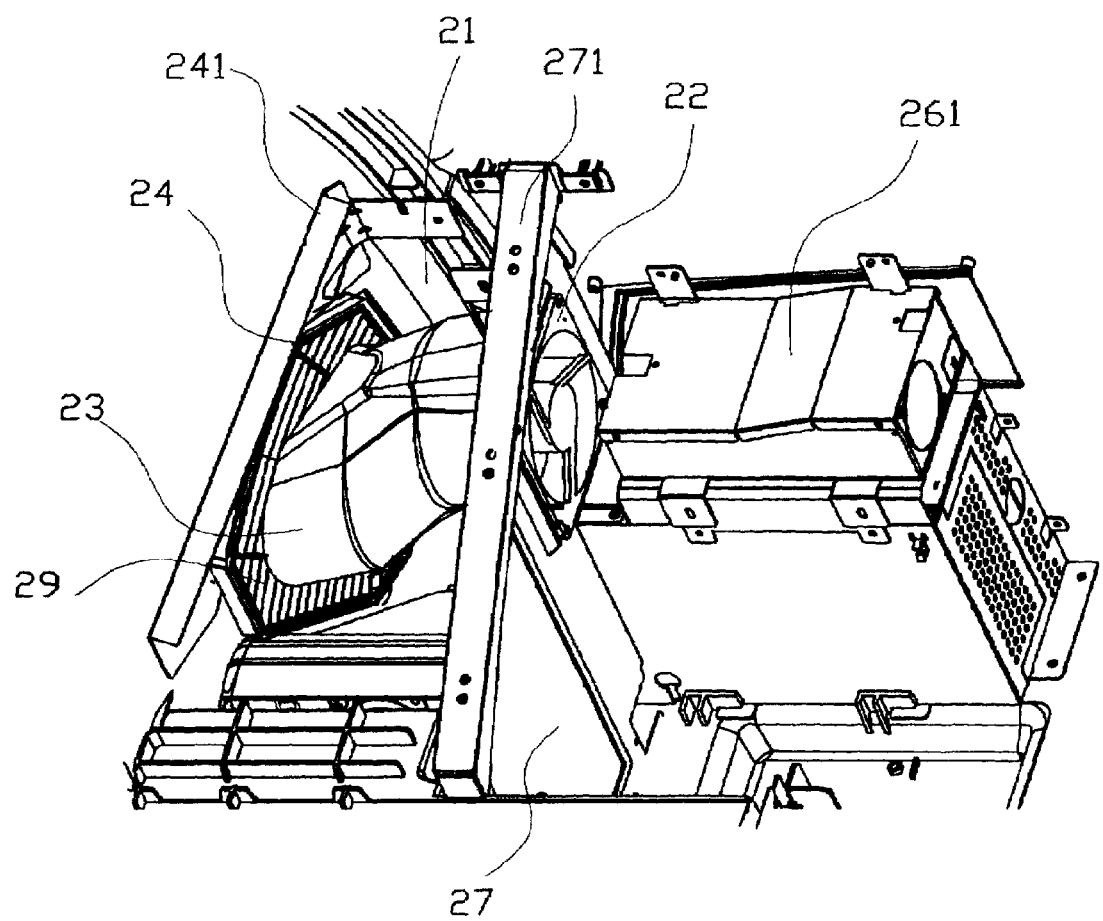
FIG. 3 is a perspective view of an exhausting structure assembled in a rear projection TV according to one embodiment of the invention.

Referring to FIG. 3, the fan 22 is mounted inside the through hole 272 near the light source 261 that is a main heat source. A fence 29 having downward-inclining blades is mounted at the outlet 24. The conduit 23 is preferably bent, and formed of rubber or sound-absorptive material to increase noise absorption effect. One end of the conduit 23 inserts in a ventilating side of the fan 22, and the other end of the conduit 23 communicates with the fence 29 for heat discharge.

Figure 4:
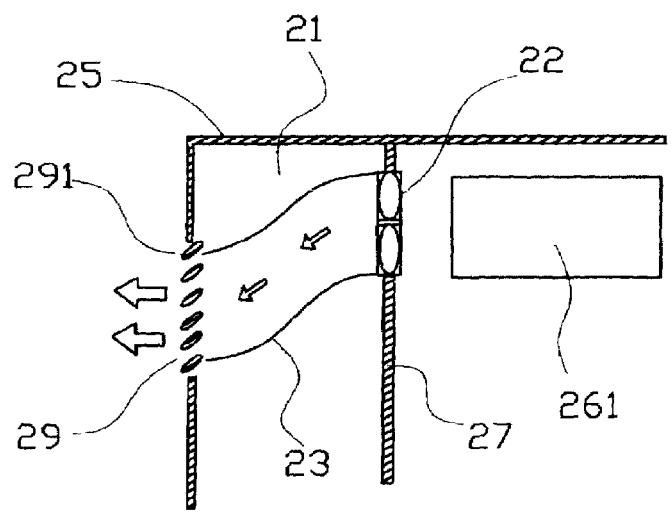
FIG. 4 is a schematic view of the operation of an exhausting structure mounted in a rear projection TV according to one embodiment of the invention.

Referring to FIG. 4, heat coming from the optical engine 26 and electronic components (not shown) is conducted along the spacer 27 and sucked by the fan 22 mounted near the heat source to drain out of the fence 29 along a curved path of the conduit 23. Thereby, heat accumulation in the TV 20 or the ventilating chamber 21 and heat recycle can be prevented to increase heat dissipation inside the TV 20. Furthermore, the fan 22 is mounted on the spacer 27, not externally exposed. The conduit 23 and the ventilating chamber 21 can effectively isolate any noise generated by the rotation of the fan 22.

The bent shape of the conduit 23 blocks the light from externally transmitting via the fan 22 and the fence 29. Furthermore, the conduit 23 and the fence 29 having downward-declining blades, in conjunction with the ventilating chamber, have great contribution in stopping the entry of dusts into the optical engine 26 and preventing contamination of optical components. Thereby, quality of projected images can be kept as high as possible. The casing 25 has a backward shrunken side adjacent to the ventilating chamber. The fence 29 is mounted on the backward shrunken side of the casing 25 so that the fence 29 does not contact any object next to the casing 25. Therefore, the fence 29 discharges the heat smoothly.

It should be apparent to those skilled in the art that the above description is only illustrative of specific embodiments and examples of the invention. The invention should therefore cover various modifications and variations made to the herein-described structure and operations of the invention, provided they fall within the scope of the invention as defined in the following appended claims.

What is claimed is:

1. A rear projection TV, comprising:
   a casing for containing an optical engine with a light source for illuminating the TV, a screen, and a reflector;
   a spacer disposed in the housing for separating a ventilating chamber and a rear chamber, the optical engine being disposed in the rear chamber;
   an outlet formed on the housing and the ventilating chamber for enabling fluid communication between the ventilating chamber and the outside of the TV; and
   a fan disposed in the spacer for drawing air out of the rear chamber and blowing the air out of the TV through the outlet.

2. The rear projection TV of claim 1, further comprising a conduit disposed in the ventilating chamber, wherein a first end of the conduit is connected to the fan and a second end of the conduit is connected to the outlet, and the air drawn out of the rear chamber is blown out of the TV through the conduit.

3. The rear projection TV of claim 2, wherein the conduit is bent for preventing light emitted by the optical engine from being transmitted outside of the TV through the conduit.

4. The rear projection TV of claim 2, wherein the conduit is formed of sound-absorptive material.

5. The rear projection TV of claim 2, wherein the conduit is formed of rubber.

6. The rear projection TV of claim 1, further comprising a fence disposed at the outlet.

7. The rear projection TV of claim 6, wherein the fence comprises a plurality of downward-declining blades.

* * * * *